United States Patent
Anand (10) Patent No.: US 11,405,212 B2
(45) Date of Patent: Aug. 2, 2022

(54) MONITORING AND PREVENTING USE OF WEAK CRYPTOGRAPHIC LOGIC

(71) Applicant: IMPERVA, INC., Redwood Shores, CA (US)

(72) Inventor: Kunal Anand, Marina Del Rey, CA (US)

(73) Assignee: IMPERVA, INC., San Mateo, CA (US)

( * ) Notice: Subject to any disclaimer, the term of this patent is extended or adjusted under 35 U.S.C. 154(b) by 258 days.

(21) Appl. No.: 16/656,469

(22) Filed: Oct. 17, 2019

(65) Prior Publication Data

US 2020/0213120 A1 Jul. 2, 2020

Related U.S. Application Data

(60) Provisional application No. 62/787,141, filed on Dec. 31, 2018.

(51) Int. Cl.
*H04L 9/32* (2006.01)
*H04L 29/06* (2006.01)
*H04L 9/40* (2022.01)

(52) U.S. Cl.
CPC .......... *H04L 9/3234* (2013.01); *H04L 63/105* (2013.01)

(58) Field of Classification Search
CPC ... H04L 9/3234; H04L 63/105; H04L 9/0618; H04L 9/065; H04L 9/0643; G06F 21/602
USPC .......................................... 713/155, 164–167
See application file for complete search history.

(56) References Cited

U.S. PATENT DOCUMENTS

| | | | | |
|---|---|---|---|---|
| 2011/0141276 A1* | 6/2011 | Borghei | ................ | H04W 12/12 348/143 |
| 2015/0271145 A1* | 9/2015 | Jalisatgi | .................. | H04L 67/42 713/168 |
| 2017/0279609 A1* | 9/2017 | Cho | ...................... | H04L 63/105 |
| 2019/0286842 A1* | 9/2019 | Keles | ...................... | G06F 21/30 |

OTHER PUBLICATIONS

The framework of runtime application self-protection technology, Cisar et al, Nov. 2016 (Year: 2016).*

* cited by examiner

*Primary Examiner* — Jahangir Kabir
(74) *Attorney, Agent, or Firm* — Nicholson, De Vos, Webster & Elliott, LLP (57) ABSTRACT

A runtime application self protection (RASP) plug-in monitors for, and prevents, invocation of unacceptably weak cryptographic processing requested by an application. Since the RASP plug-in is linked to the application, the RASP plug-in has access to information regarding an execution state of the application logic, including interaction with shared libraries, to determine what component of the application requests use of unacceptable cryptographic techniques. Such enables owners/operators of an application to easily detect requests for unacceptable cryptographic techniques, even if such requests originate in a portion of the application that is not under the control of the owners/operators.

10 Claims, 5 Drawing Sheets

```
{
  "timestamp": "Jul 17 2018 21:27:47 UTC",
  "vendor": "Prevoty",
  "product": "RASP",
  "product_version": "3.10.0",
  "mode": "protect",
  "action": "blocked",
  "severity": "high",
  "category": "Weak Cryptography",
  "direction": "inbound",
  "engine": "cryptography",
  "app": "Acme",
  "application_metadata": {},
  "app_lang": "java",
  "app_version": "1.8.0_171",
  "vm_runtime_version": "25.171-b11",
  "os": "Mac OS X",
  "os_version": "10.13.5",
  "user": "ka",
  "src_ip": "0:0:0:0:0:0:0:1",
  "src_port": 59774,
  "dest_ip": "0:0:0:0:0:0:0:1",
  "dest_port": 8082,
  "http_content_type": "application/x-www-form-urlencoded; charset=UTF-8",
  "http_method": "POST",
  "http_referrer": "http://localhost:8082/acme-webapp-java/",
  "http_user_agent": "Mozilla/5.0",
  "session_creation_time": "Jul 17 2018 21:26:28 UTC",
  "session_is_new": false,
  "transport": "tcp",
  "uri_path": "/acme-webapp-java/crypto",
  "url": "http://localhost:8082/acme-webapp-java/crypto",
  "cookies": {
   "JSESSIONID": "e6qem5upsajc194ghyl48sokj"
  },
  "session_attributes": {
   "ACME Username": "acme_default_user",
   "ACME Role": "user"
  },
  "algorithm": "md5",
  "line_number": 60,
  "script_name": "Class2.java",
  "stack_trace":
"com.prevoty.query.CryptoProcessor.processCrypto(CryptoProcessor.java:214)
\\ncom.acme.example.Class3.method3(Class3.java:60)
\\ncom.acme.example.Class2.method2(Class2.java:60)
\\ncom.acme.example.Class1.method1(Class1.java:60)"
}
```

MONITORING AND PREVENTING USE OF WEAK CRYPTOGRAPHIC LOGIC

CROSS REFERENCE TO RELATED APPLICATION

This non-provisional application claims the benefit of U.S. provisional application No. 62/787,141, filed Dec. 31, 2018, which application is incorporated herein in its entirety by this reference.

BACKGROUND

The importance of security in computer networking whose presence reaches into nearly every facet of life today cannot be over-stated. Nearly all computer security is rooted in complex cryptography.

In general, cryptography involves obscuring data in such a manner that successfully recovering or replicating the obscured data would require more computational power than is currently available. As computational power continues to follow Moore's Law of exponential growth, once sufficiently secure cryptographic techniques become obsolete. In particular, computational power eventually becomes sufficient to successfully recover or replicate data obscured by these techniques. Thus, cryptographic techniques tend to follow a predictable life cycle into obsolescence.

In many contexts, current, secure cryptographic processing is essential to providing services trusted by the consuming public. In other contexts, e.g., health care and financial systems, current and secure cryptographic processing is mandated by law.

To remain secure, applications relying on cryptography require periodic adaptation and modification to use newer, more secure cryptographic techniques. Currently, ensuring use of cryptographic techniques of sufficient complexity and security is achieved through static code analysis (SCA). SCA involves examining source code of a given application and looking for logic therein that invokes cryptographic processing and analyzing that logic. SCA has a number of shortcomings. First and foremost is that predicting the behavior of an application from its source code without actual execution of the source code is difficult and often inaccurate. What an application's source code would seem to do during execution, particularly to a human software engineer, often deviates significantly from the actual behavior of the application.

Even if SCA were an accurate and effective mechanism for ensuring that a given application uses only current and acceptable cryptography, the complexity of many applications makes maintenance of such applications through SCA arduous and onerous. Many applications in use today are extremely complex, often including millions of lines of source code. Some applications that have been in use for an inordinately long period of time are not fully understood and manageable by the owners/operators of such applications. Examples of such applications can be found in military, government, and similar environments. Often, even when a complex application can be maintained by its owner/operator, only a small portion of the entirety of the source code responsible for the behavior of the application is under the control of the owner/operator, frequently about 20%. Accordingly, conventional analysis of source code available to the owner/operator of the application logic is inadequate to ensure that the entirety of the behavior of the application logic, including portions defined by others, uses acceptable levels of cryptographic security. This can render up to 80% or more of the vulnerabilities in a given application unpatchable by the owner/operator of the application.

What is needed is application-aware security techniques that can ensure proper use of cryptographic techniques that comply with National Institute of Standards and Technology (NIST) and other security bodies on robust hashing algorithms and symmetric key ciphers.

SUMMARY

The present invention relates generally to computer network security and, more particularly, methods of and systems for improving computer security by preventing use of impermissibly weak cryptographic logic.

In accordance with the present invention, a runtime application self protection (RASP) plug-in monitors for, and prevents, invocation of unacceptably weak cryptographic processing requested by an application. Since the RASP plug-in is linked to the application, the RASP plug-in has access to information regarding an execution state of the application logic, including interaction with shared libraries, to determine what component of the application requests use of unacceptable cryptographic techniques. Such enables owners/operators of an application to easily detect requests for unacceptable cryptographic techniques, even if such requests originate in a portion of the application that is not under the control of the owners/operators.

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

In order that the present invention may be more clearly ascertained, some embodiments will now be described, by way of example, with reference to the accompanying drawings, in which.

DETAILED DESCRIPTION

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

Aspects, features and advantages of exemplary embodiments of the present invention will become better understood with regard to the following description in connection with the accompanying drawing(s). It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute and/or sequential terms, such as, for example, "will," "will not," "shall," "shall not," "must," "must not," "first," "initially," "next," "subsequently," "before," "after," "lastly," and "finally," are not meant to limit the scope of the present invention as the embodiments disclosed herein are merely exemplary.

In accordance with the present invention, runtime application self protection (RASP) plug-in 224 (FIG. 2) monitors for, and prevents, invocation of unacceptably weak cryptographic processing requested by application logic 220. Since RASP plug-in 224 is linked to application logic 220, RASP plug-in 224 has access to information regarding an execution state of application logic 220, including interaction with shared libraries 222, to determine what component of application logic 220 requests use of unacceptable cryptographic techniques. Such enables owners/operators of application logic 220 to easily detect request for unacceptable cryptographic techniques, even if such a request originates in a portion of application logic 220 that is not under the control of the owners/operators.

Figure 1:
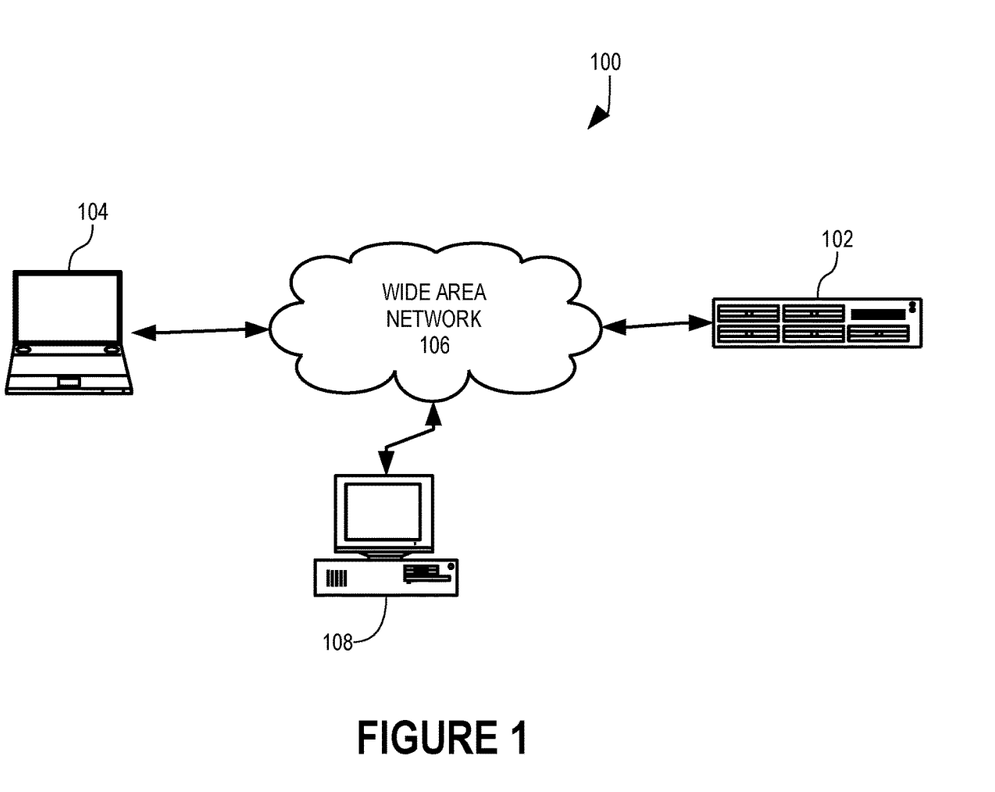
FIG. 1 is a diagram showing a wide-area network through which a client device is connected to a server computer that performs application-aware network security in accordance with one embodiment of the present invention.
Figure 2:
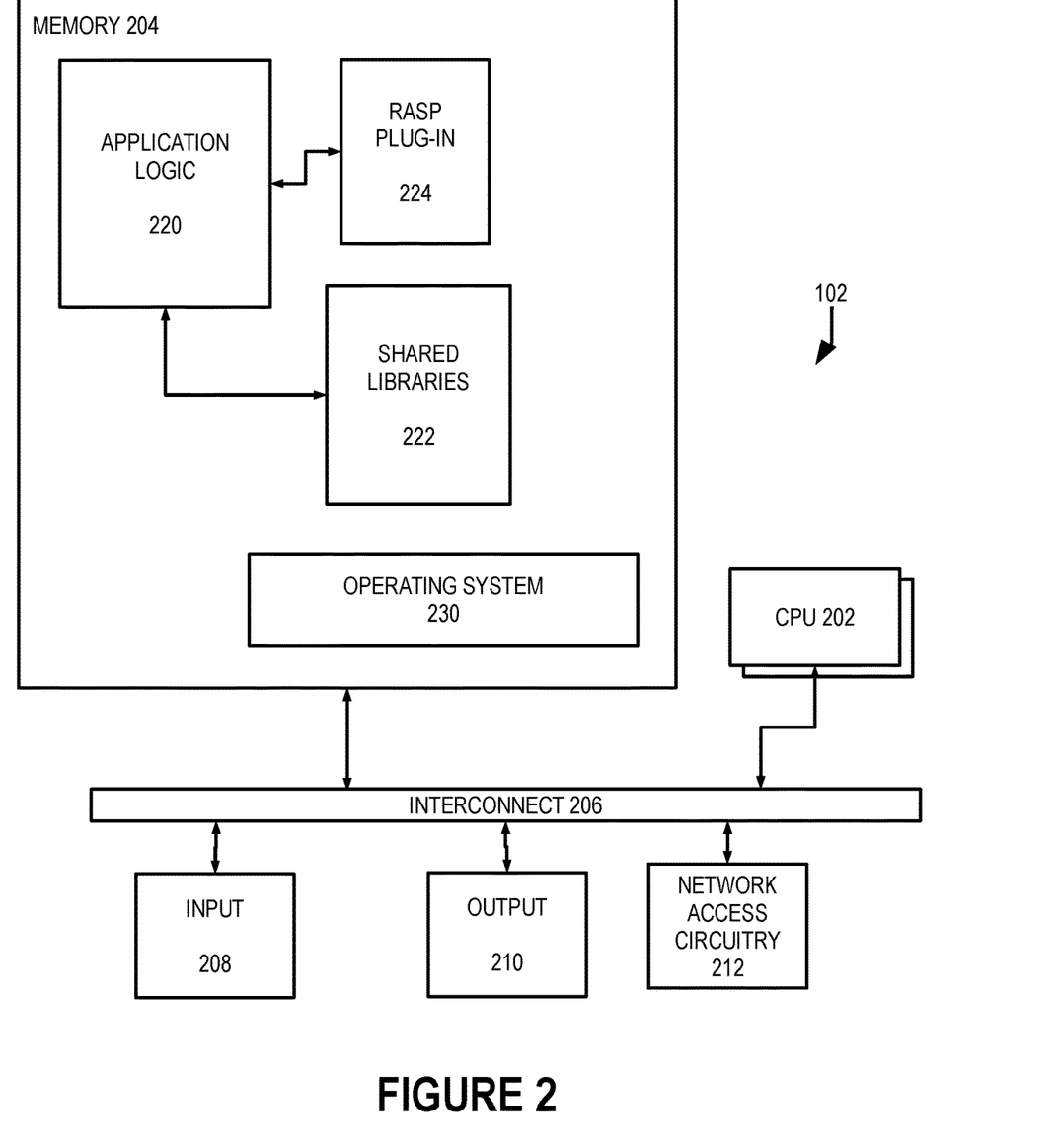
FIG. 2 is a block diagram showing the server of FIG. 1 in greater detail.

As shown in FIG. 1, network security system 100 includes a server 102 and a client computer 104 that are connected to one another though a wide area network (WAN) 106. Server 102 provides a service defined by application logic 220 (FIG. 2). Server 102 can include additional application logic to provide additional services. In addition, while server 102 is shown in FIG. 1 as a single computer system, it should be appreciated that server 102 can be implemented as multiple computer systems using known distributed computing techniques.

Client computer 104 sends to server 102 requests for the service provided by application logic 220 (FIG. 2) of server 102. While a single client computer 104 is shown in FIG. 1, it should be appreciated that server 102 can serve requests from thousands or even millions of computers through WAN 106. Another computer 108 is used by a malicious cracker in this illustrative example and is used by the malicious cracker to intercept information between server 102 and client computer 104 or otherwise acquire data representing sensitive information from server 102. Computer 108 includes logic for breaking cryptographically obscured data to obtain private data therefrom. To prevent computer 108 from obtaining such private data, server 102 is configured to use only acceptable cryptographic techniques that computers such as computer 108 should not be able to crack.

To facilitate appreciation and understanding of the transaction of transaction flow diagram 400 (FIG. 4, described below), the general structure of server 102 is described.

Server 102 is a computer and is shown in greater detail in FIG. 2. Server 102 includes one or more microprocessors 202 (collectively referred to as CPU 202) that retrieve data and/or instructions from memory 204 and execute retrieved instructions in a conventional manner. Memory 204 can include generally any computer-readable medium including, for example, persistent memory such as magnetic and/or optical disks, ROM, and PROM and volatile memory such as RAM.

CPU 202 and memory 204 are connected to one another through a conventional interconnect 206, which is a bus in this illustrative embodiment and which connects CPU 202 and memory 204 to one or more input devices 208, output devices 210, and network access circuitry 212. Input devices 208 can include, for example, a keyboard, a keypad, a touch-sensitive screen, a mouse, a microphone, and one or more cameras. Output devices 210 can include, for example, a display—such as a liquid crystal display (LCD)—and one or more loudspeakers. Network access circuitry 212 sends and receives data through computer networks such as wide area network 106 (FIG. 1).

Since server 102 (FIG. 2) is a server computer, server 102 does not necessarily include input and output devices but can include input devices 208 and output devices 210. In addition, while server 102 is shown to be a single computer in this illustrative embodiment, it should be appreciated that the behavior of server 102 described herein can be distributed across multiple, cooperating computer systems using conventional techniques.

A number of components of server 102 are stored in memory 204. In particular, application logic 220, shared libraries 222, RASP plug-in 224, and operating system 230 are each all or part of one or more computer processes executing within CPU 202 from memory 204 in this illustrative embodiment but can also be implemented using digital logic circuitry. As used herein, "logic" refers to (i) logic implemented as computer instructions and/or data within one or more computer processes and/or (ii) logic implemented in electronic circuitry.

Application logic 220 controls the behavior of server 102 in performing the services provided by server 102. For example, if application logic 220 implements social networking, application logic 220 controls the user interface, features, and behavior of the particular social networking implemented by application logic 220.

Shared libraries such as shared libraries 222 are known but are described briefly herein to facilitate understanding and appreciation of the present invention. Shared libraries 224 include logic that performs functions that are generally shared among multiple applications. These could include shared libraries, or libraries provided by the runtime. For example, shared libraries 222 can provide logic that implements encryption tools and protocols such as MD-5 and SHA-412, for example. Accordingly, software engineers building application logic 220 can leverage from the work of others by using a shared library that implements these encryption protocols, as can developers of applications other than application logic 220.

Shared libraries 222 can be dynamically linked. Dynamically linked libraries (DLLs) are loaded and linked only as needed during execution of applications such as application logic 220. DLLs are known and are not described further herein. Other types of libraries are also available based upon architecture. For example in a Linux environment shared objects could be utilized, and JARs are common in Java.

RASP plug-in 224 is a plug-in that augments the behavior of application logic 220. Some applications, e.g., application logic 220, include logic that checks for the presence of plug-ins and, if present, uses found plug-ins to augment or change the behavior of the application. Such logic is sometimes referred to as "hooks". RASP plug-in 224 is connected to application logic 220 with hooks that cause any network connections created by application logic 220 to be processed by RASP plug-in 224. In this illustrative embodiment, RASP plug-in 224 is dynamically linked.

Figure 3:
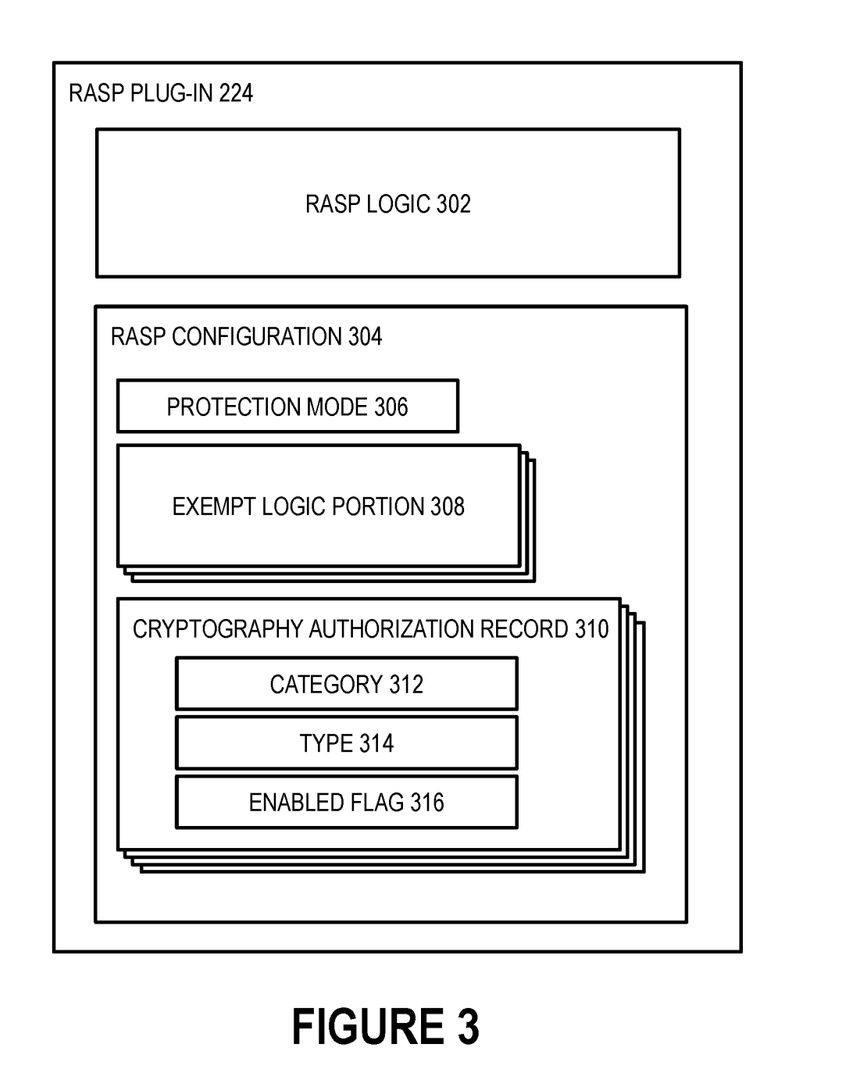
FIG. 3 is a block diagram showing a RASP plug-in of the server of FIG. 1 in greater detail.

RASP plug-in 224 is shown in greater detail in FIG. 3. RASP plug-in 224 includes RASP logic 302 and RASP configuration 304. RASP logic 302 is logic that defines the behavior of RASP plug-in 224. RASP configuration 304 specifies details of the behavior of RASP logic 302 specific to application logic 220.

RASP configuration 304 includes a protection mode 306, exempt logic portions 308, and cryptography authorization records 310. Protection mode 306 specifies in which of several modes RASP logic 302 is to operate. In this illustrative embodiment, protection mode 306 specifies one of three modes: "disabled", "monitor", and "protect". In "disabled" mode, RASP logic 302 takes no action, allowing application logic 220 to act as if RASP plug-in 224 is not installed. In "monitor" mode, RASP logic 302 identifies requests to use unacceptable cryptographic techniques but allows the requested use. In "protect" mode, RASP logic 302 both identifies requests to use unacceptable cryptographic techniques and prevents such use. This behavior is described more completely below.

Exempt logic portions 308 each specify a portion of application logic 220 that is permitted to use any cryptographic techniques regardless of RASP configuration 304. In this illustrative embodiment, application logic 220 is object-oriented and exempt logic portions 308 each identify a class within application logic 220 that is permitted to use any cryptographic techniques.

Cryptography authorization records 310 each specify a category 312, a type 314, and an enabled flag 316. Type 314 identifies a particular cryptographic technique. Category 312 identifies a general category of cryptography to which the cryptographic technique of type 314 belongs. For example, category 312 can specify hashing algorithms or symmetric key cyphers as a general category of cryptographic techniques.

For the category of hashing algorithms, type 314 can identify, for example, MD2, MD4, MD5, SHA-0, and SHA-1 hashing algorithms. For the category of symmetric key cyphers, type 314 can identify, for example, AES, blowfish, DES, RC2, and RC4 symmetric key cyphers. In alternative embodiments, cryptography authorization records 310 can be organized as a separate record for each category and all cryptography techniques of a given category can be grouped together.

Enabled flag 316 specifies whether cryptographic techniques of the type identified by type 314 is enabled or disabled. In an alternative embodiment, enabled flag 316 can specify, for each cryptographic technique, whether the associated cryptographic technique is to be monitored or protected, in effect specifying a protection mode for each cryptographic technique.

Figure 4:
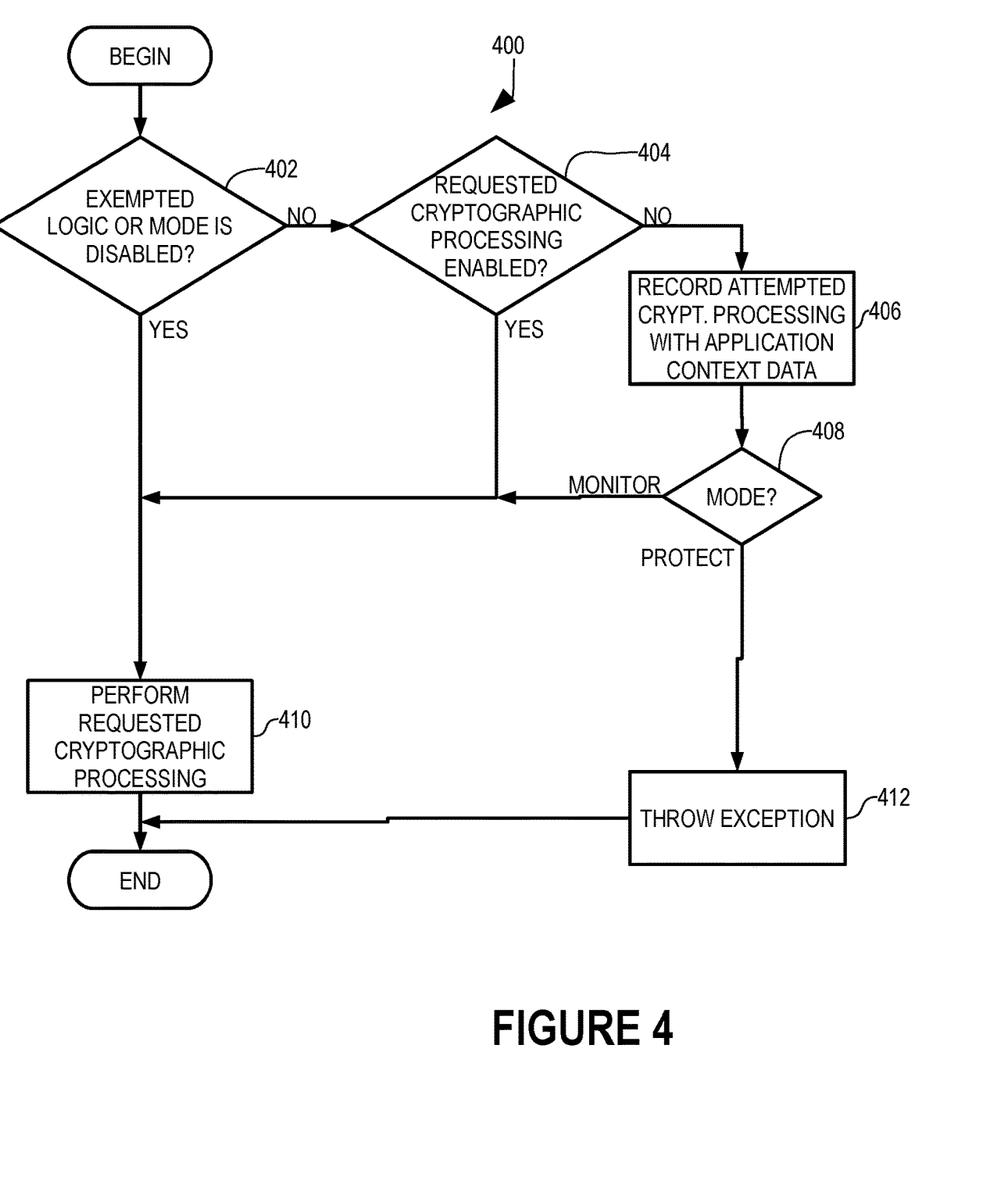
FIG. 4 is a logic flow diagram illustrating performance of application-aware network security in accordance with one embodiment of the present invention.

The processing of a request for cryptographic processing received by RASP logic 302 is illustrated by logic flow diagram 400 (FIG. 4). In the context of logic flow diagram 400, the particular type of cryptographic processing requested by application logic 220 is sometimes referred to as "the subject cryptographic technique".

In test step 402, RASP logic 302 refers to protection mode 306 and protocols/exempt logic portions 308. If protection mode 306 is not "disabled" and the portion of application logic 220 requesting the subject cryptographic technique is not identified as exempt by exempt logic portions 308, processing by RASP logic 302 transfers from test step 402 to test step 404. Conversely, if protection mode 306 is "disabled" or the portion of application logic 220 requesting the subject cryptographic technique is identified as exempt by exempt logic portions 308, processing by RASP logic 302 transfers from test step 402 to step 410, which is described below.

In test step 404, RASP logic 302 determines whether the subject cryptographic technique is enabled in cryptography authorization records 310. If so, processing transfers to step 410 in which RASP logic 302 invokes the requested cryptographic technique, possibly through shared libraries, shared objects, JARs, etc. 222. Thus, when the subject cryptographic technique is identified as enabled by cryptography authorization records 310, requested by an exempt portion of application logic 220 identified by exempt logic portions 308, or when RASP plug-in 224 is disabled, application logic 220 behaves entirely as it would without RASP plug-in 224.

Figure 5:
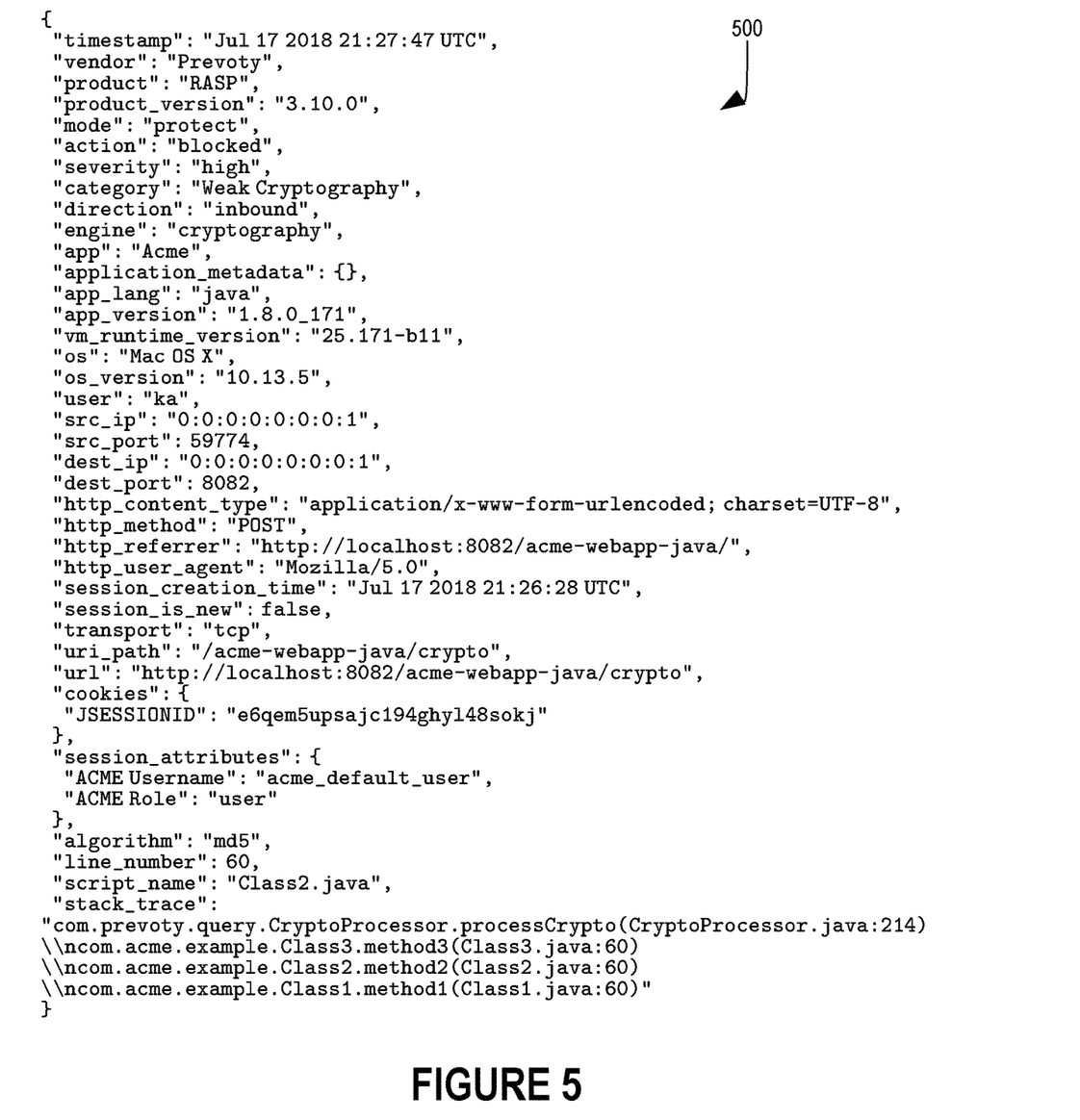
FIG. 5 is a diagram of a log entry reporting attempted creation of an unauthorized network connection in a step of the logic flow diagram of FIG. 4.

Conversely, if the subject cryptographic technique is not enabled in cryptography authorization records 310, processing by RASP logic 302 transfers from test step 404 to step 406. In step 406, RASP logic 302 records information about the requested invocation of the disabled subject cryptographic technique and stores the information in a log of operating system 230 (FIG. 2). An example of the information recorded in step 406 (FIG. 4) in this illustrative embodiment is shown as log entry 500 (FIG. 5).

Log entry 500 is in the form of JavaScript Object Notation (JSON) and includes information regarding an execution state of application logic 220, including portions of application logic 220 not under the control of the owner/operator of application logic 220, e.g., shared libraries 222. Since RASP plug-in 224 is a plug-in coupled to application logic 220, RASP plug-in 224 has access to information otherwise accessible to application logic 220 itself, and this information is recorded in log entry 500. For example, application logic 220 is identified as "Acme" in association with the JSON key, "app".

Log entry 500 identifies the subject cryptographic technique. See, e.g., "algorithm": "md5". Log entry 500 also specifies the particular component of application logic 220 from which the request for the subject cryptographic technique originated. See, e.g., (i) "line_number": 60; (ii)"script_name": "Class2.java"; and (iii) the key "stack_trace". The text, "Class2.java", and the line number, 60, specify a specific line within a source code data file of application logic 220 from which the request for the subject cryptographic technique is received by RASP plug-in 224. The data associated with the key "stack_trace" identifies a number of line numbers within a number of other source code data files whose execution caused line 60 of data file Class2.java to request the subject cryptographic technique, including program execution control flow. This information assists computer engineers in identifying, with great specificity, the particular portion of application logic 220 in which use of this unacceptably weak cryptographic technique is requested.

Log entry 500 includes other data representing the execution state of application logic 220. For example, log entry 500 includes (i) "cookies": {"JSESSIONID": "e6qem5upsajc194ghyl48sokj"} identifying the specific session in which the attack was launched, or where weak cryptographic technique was requested and (ii) "session_attributes": {"ACME Username": "acme_default_user", "ACME Role": "user"} identifying the authenticated user of the session in which the attack was launched/weak cryptographic technique was requested.

Thus, log entry 500 helps computer engineers responsible for the proper functioning of application logic 220 to identify the specific part of application logic 220 that uses unacceptably weak cryptography. Log entry 500 does this using information that is not ordinarily available outside application logic 220.

Returning to logic flow diagram 400 (FIG. 4), processing by RASP logic 302 transfers from step 406 to test step 408. In test step 408, RASP logic 302 determines whether protection mode 306 is "monitor" or "protect". If protection mode 306 is "monitor", processing transfers to step 410 in which RASP logic 302 invokes the subject cryptographic technique as described above. Conversely, if protection mode 306 is "protect", processing transfers to step 412 in which RASP logic 302 throws an exception, e.g., reports an error.

If application logic 220 is already designed according to commonly accepted "best" practices, application logic 220 includes logic for catching such an exception and processing any error arising from a failed attempt to invoke cryptographic processing. RASP logic 302 additionally may include a feature for catching uncaught exceptions as well. Accordingly, application logic 220 requires no modification to properly handle failure to invoke cryptographic processing blocked by RASP plug-in 224, in effect gracefully and safely reacting to an uncaught exception.

After step 410 or step 412, processing according to logic flow diagram 400 completes.

The above description is illustrative only and is not limiting. The present invention is defined solely by the claims which follow and their full range of equivalents. It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

While this invention has been described in terms of several embodiments, there are alterations, modifications, permutations, and substitute equivalents, which fall within the scope of this invention. Although sub-section titles have been provided to aid in the description of the invention, these titles are merely illustrative and are not intended to limit the scope of the present invention.

What is claimed is:

1. A method for improving security of computer logic that is configured to provide a network service, the method comprising:
   receiving, by a runtime application self protection (RASP) plug-in, request data from the computer logic, wherein the request data represents a request by the computer logic to perform cryptographic processing in a session between the computer logic and a remotely-located user that is authenticated by the computer logic, wherein the RASP plug-in is connected to the computer logic with hooks that cause network connections created by the computer logic to be processed by the RASP plug-in;
   determining, by the RASP plug-in, that the requested cryptographic processing is not one of one or more predetermined authorized cryptographic processing types associated with the computer logic, wherein the one or more predetermined authorized cryptographic processing types correspond to encryption techniques that are considered to be acceptable to be used by the computer logic; and
   in response to the determining, generating and recording, by the RASP plug-in, exception report data reporting an exception, wherein the exception report data includes:
      request origination data that identifies a component of the computer logic from which the request data is received and
      user identification data that identifies the user.

2. The method of claim 1 wherein the predetermined authorized cryptographic processing types are specified by one or more selected from the group consisting essentially of: cryptographic category identification data, cryptographic type data, and authorization data.

3. The method of claim 1 wherein the request origination data identifies the component of the computer logic from which the request data is received by specifying one or more selected from the group consisting essentially of: a source code data file, a line number identifying the particular line of the source code data file from which the request data originated, and one or more source code data files and associated data lines whose execution caused the component to send the request data.

4. The method of claim 1 wherein the user identification data identifies the user by specifying one or more selected from the group consisting essentially of: a user name associated with the user within the computer logic, a role of the user, and data identifying the session.

5. The method of claim 1 further comprising:
   in response to the determining:
      denying the request by declining to perform the cryptographic processing; and
      sending exception data to the computer logic to report the denial of the request.

6. A computer system for improved security comprising:
   one or more microprocessors; and
   a non-transitory computer-readable medium that stores instructions that when executed by the one or more microprocessors causes the computer system to perform operations of a runtime application self protection (RASP) plug-in that is connected to computer logic within a network service system with hooks that cause network connections created by the computer logic to be processed by the RASP plug-in, wherein the operations comprise:
   receiving request data from the computer logic, wherein the request data represents a request by the computer logic to perform cryptographic processing in a session between the computer logic and a remotely-located user that is authenticated by the computer logic, determining that the requested cryptographic processing is not one of one or more predetermined authorized cryptographic processing types associated with the computer logic, wherein the one or more predetermined authorized cryptographic processing types correspond to encryption techniques that are considered to be acceptable to be used by the computer logic, and
   in response to the determining, generating and recording exception report data reporting an exception, wherein the exception report data includes:
      request origination data that identifies a component of the computer logic from which the request data is received and
      user identification data that identifies the user.

7. The computer system of claim 6 wherein the predetermined authorized cryptographic processing types are specified by one or more selected from the group consisting essentially of: cryptographic category identification data, cryptographic type data, and authorization data.

8. The computer system of claim 6 wherein the request origination data identifies the component of the computer logic from which the request data is received by specifying one or more selected from the group consisting essentially of: a source code data file, a line number identifying the particular line of the source code data file from which the request data originated, and one or more source code data files and associated data lines whose execution caused the component to send the request data.

9. The computer system of claim 6 wherein the user identification data identifies the user by specifying one or more selected from the group consisting essentially of: a user name associated with the user within the computer logic, a role of the user, and data identifying the session.

10. The computer system of claim 6, wherein the operations further comprise:
    in response to the determining,
        denying the request by declining to perform the cryptographic processing; and
        sending exception data to the computer logic to report the denial of the request.

\* \* \* \* \*